United States Patent [19]

Kagawa et al.

[11] Patent Number: 4,751,735
[45] Date of Patent: Jun. 14, 1988

[54] STEREO DEMODULATION DEVICE

[75] Inventors: Shigeru Kagawa; Kazuo Tokuda, both of Tokyo, Japan

[73] Assignee: NEC Corporation, Tokyo, Japan

[21] Appl. No.: 836,487

[22] Filed: Mar. 5, 1986

[30] Foreign Application Priority Data

Mar. 8, 1985 [JP] Japan .................................. 60-45906

[51] Int. Cl.⁴ ............................................. H04H 5/00
[52] U.S. Cl. ...................................................... 381/13
[58] Field of Search ............................... 381/13, 2, 3, 4

[56] References Cited

U.S. PATENT DOCUMENTS

| | | | |
|---|---|---|---|
| 4,107,614 | 8/1978 | Sugai | 455/220 |
| 4,314,377 | 2/1982 | Kondo et al. | 381/13 |
| 4,419,541 | 12/1983 | Kishi et al. | 381/13 |

Primary Examiner—Forester W. Isen
Attorney, Agent, or Firm—Burns, Doane, Swecker & Mathis

[57] ABSTRACT

A stereo demodulation device includes an audio signal processing circuit, a muting circuit, a muting switch, and a variable resistor. At least a given signal processing function of the audio signal processing circuit is adjusted by supplying a control current from a control terminal thereof. The muting circuit outputs or blocks an audio signal processed by the audio signal processing circuit. A muting switch is commonly connected to a control terminal of the muting circuit and the control terminal for the given signal processing function of the audio signal processing circuit. The variable resistor adjusts the control current.

6 Claims, 2 Drawing Sheets

STEREO DEMODULATION DEVICE

BACKGROUND OF THE INVENTION

The present invention relates to a stereo demodulation device and, more particularly, to a stereo demodulation device including an audio muting circuit.

A PLL (Phase Locked Loop) multiplex demodulating IC (Integrated Circuit) is used in a conventional FM stereo receiver. Along with the multifunctions of conventional FM stereo receivers, a pilot canceller, a separation adjuster, an active filter, and an audio output muting circuit have been included in recent models. Because of this, adjustment positions and control terminals are required for the respective functions. For example, a conventional stereo demodulator with pilot cancel and audio muting functions requires two terminals, i.e., a pilot cancel signal generation terminal and a pilot cancel setting terminal. The number of pins in a stereo demodulation IC is thus increased. When additional functions such as a pilot canceller function are added to an IC, adjustment and control terminals are inevitably increased. As a result, the number of pins of the IC package becomes limited and the resultant IC becomes expensive.

SUMMARY OF THE INVENTION

It is an object of the present invention to provide a multifunction stereo demodulation device with a small number of terminals, which solves the conventional drawback described above.

In order to achieve the above object of the present invention, there is provided a stereo demodulation device, comprising: an audio signal processing circuit with at least a given signal processing function, which is adjusted by supplying a control current from a control terminal thereof; a muting circuit for outputting or blocking an audio signal processed by the audio signal processing circuit; muting switch means commonly connected to a control terminal of the muting circuit and the control terminal for the given signal processing function of the audio signal processing circuit; and current adjusting means for adjusting the control current.

DETAILED DESCRIPTION OF THE PREFERRED EMBODIMENT

The present invention will be described in detail with reference to the accompanying drawings.

Figure 1:
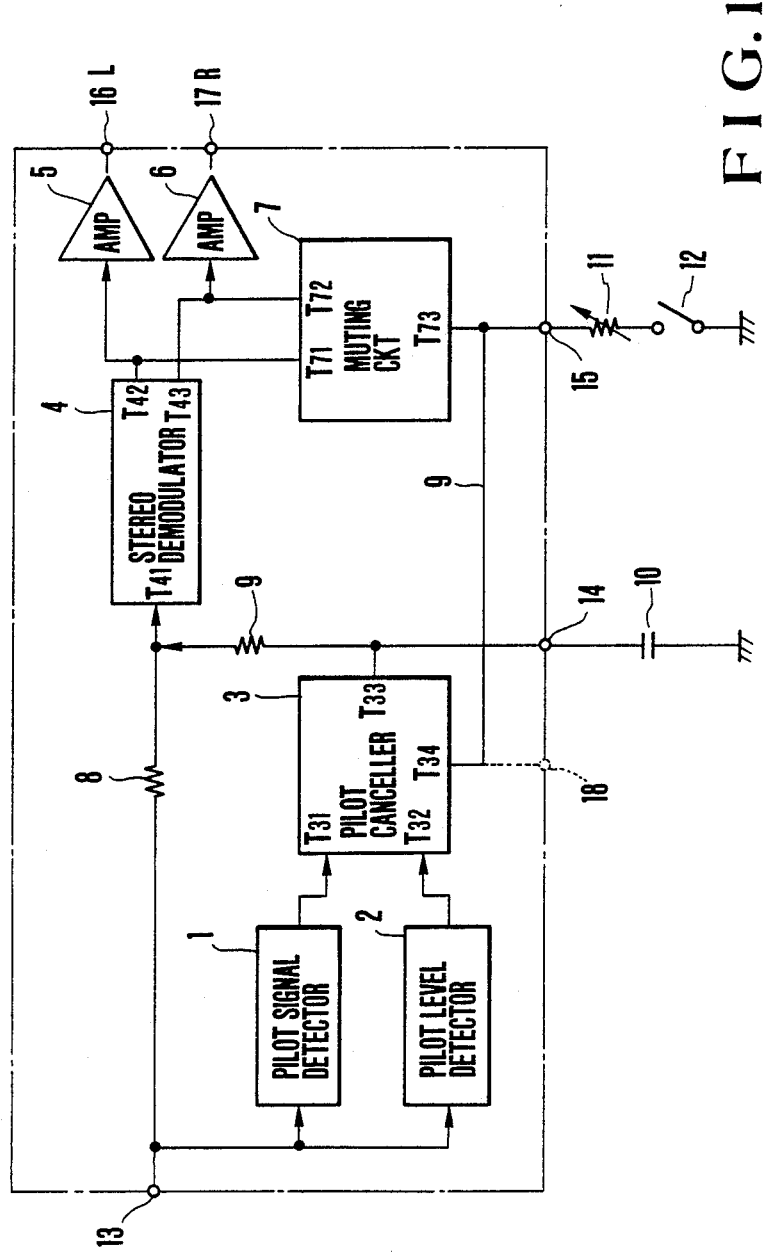
FIG. 1 is a stereo demodulation device according to an embodiment of the present invention.

FIG. 1 is a block diagram showing the main part of a stereo demodulation device according to an embodiment of the present invention. Referring to FIG. 1, a portion surrounded by the alternate long and short dashed line is built into an IC package. A plurality of pin terminals extend outside the package to provide external connections and are represented by reference numerals 13, 14, 15, 16 and 17. The pin terminal 13 is a composite signal input terminal of the stereo demodulation device and is connected to input terminals of a pilot signal detector 1 and a pilot level detector 2. The detectors 1 and 2 respectively detect the presence of a pilot signal included in a composite signal, and the level of the pilot signal. Output terminals of the detectors 1 and 2 are connected to input terminals T31 and T32 of a pilot canceller 3 for cancelling the pilot signal (of, e.g., 19 kHz). An output terminal T33 of the pilot canceller 3 is connected to the pin terminal 14 and to an input terminal T41 of a stereo demodulator 4 through a resistor 9. A resistor 8 is connected between the terminal T41 and the pin terminal 13. The pin terminal 14 is connected to one end of a capacitor 10. The other end of the capacitor 10 is grounded. Output terminals T42 and T43 of the stereo demodulator 4 are connected to input terminals of amplifiers 5 and 6, respectively. The output terminals T42 and T43 are also respectively connected to terminals T71 and T72 of a muting circuit 7. A control terminal T73 of the muting circuit 7 is connected to one terminal 15 of a variable resistor 11, together with a control terminal T34 of the pilot canceller 3. The other end of the variable resistor 11 is connected to one terminal of a muting switch 12. The other terminal of the muting switch 12 is grounded. Output terminals of amplifiers 5 and 6 are connected to the pin terminals 16 and 17 for sending L (left) and R (right) audio outputs, respectively.

The operation of the circuit device in FIG. 1 will now be described. A composite signal including a pilot signal and L and P audio signals is supplied to the terminal 13. The pilot signal detector 1 detects the presence/absence of a pilot signal included in the composite signal. A detection signal representing a stereo or monaural program is supplied from the pilot signal detector 1 to the pilot canceller 3. When the detection signal represents a stereo program, the pilot canceller 3 is operated. However, if the detection signal represents a monaural program, the pilot canceller 3 is disabled. The pilot level detector 2 generates a DC voltage proportional to the level of the pilot signal. This DC voltage is applied to the pilot canceller 3. Upon reception of the DC voltage, the pilot canceller 3 generates a pilot cancel signal, a level of which is proportional to that of the pilot signal. The pilot cancel signal is superposed on the input composite signal through the resistors 8 and 9. Thereafter, the composite signal without the pilot signal is supplied to the stereo demodulator 4. The L and R audio signals as the demodulated outputs appear at the terminals 16 and 17 through the L and R amplifiers 5 and 6, respectively. The audio muting circuit 7 connected to the input terminals of the amplifiers 5 and 6 is enabled or disabled in response to an ON or OFF operation of the switch 12. When the muting switch 12 is turned on to supply a current to the terminal 15 through the variable resistor 11, the audio muting circuit 7 is rendered inoperative, i.e., the muting OFF state. However, when the switch 12 is turned off, the muting circuit 7 is operated and held in the muting ON state. Initialization of the pilot canceller 3 at the standard input state of the input composite signal is performed such that the variable resistor 11 is adjusted while the muting switch 12 is kept on, thereby changing an amount of charging or discharging in the capacitor 10 connected to terminal 14. In a conventional device, the variable resistor 11 is not connected to the terminal 15 but to a pin terminal 18 (indicated by the dashed line in FIG. 1) directly connected to the pilot canceller control terminal T34. In this case, a line 9 for connecting the control terminal T34 of the pilot canceller 3 and the terminal 15 is not present. As compared with the device of the present invention, the conventional device requires the additional terminal (18). According to the present invention, the control terminal T73 of the muting circuit 7 and the control terminal T34 of the pilot canceller 3 are connected to the single terminal 15.

Figure 2:
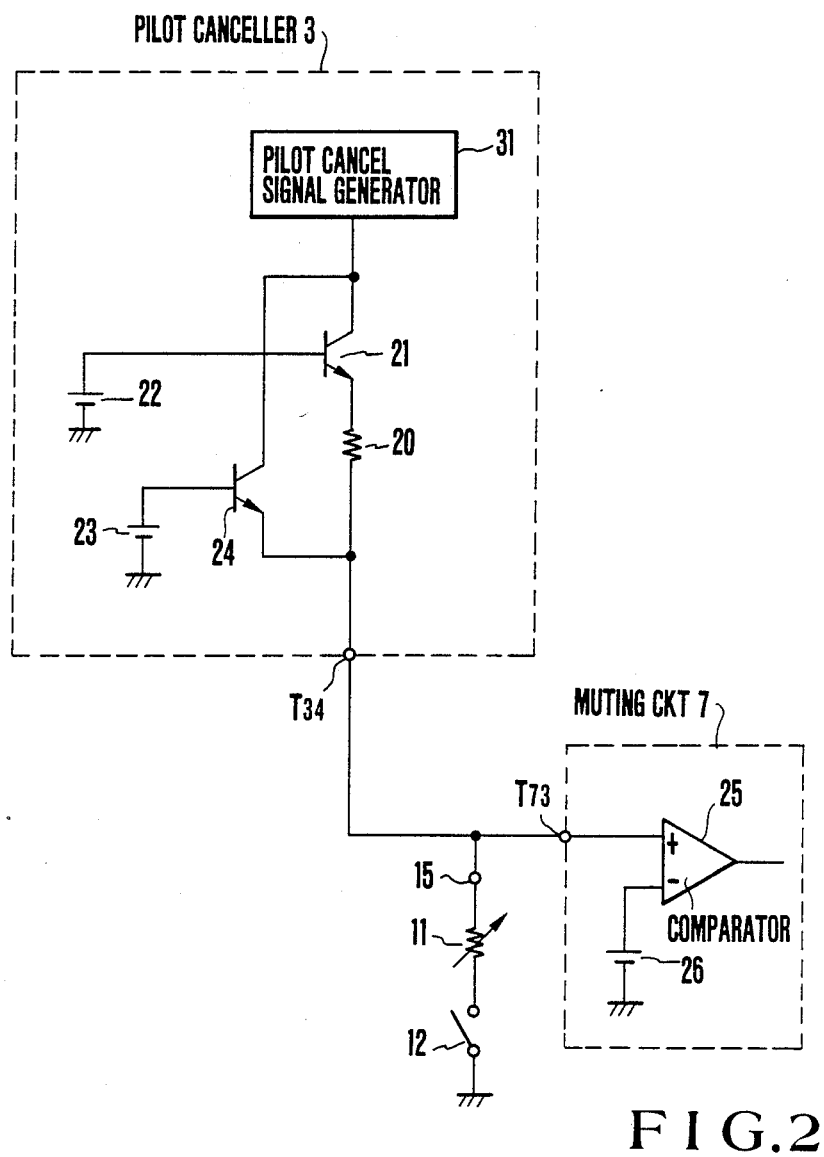
FIG. 2 is a circuit diagram showing a detailed arrangement of the circuit in FIG. 1.

FIG. 2 is a circuit diagram showing a detailed arrangement of the device in FIG. 1. Referring to FIG. 2, the control terminal T34 of the pilot canceller 3 is connected to the emitter of a transistor 21 through a resistor 20 and to the emitter of a transistor 24. The collectors of the transistors 21 and 24 are connected to a pilot cancel signal generator 31. Bias power sources 22 (6 V) and 23 (4 V) are connected to the bases of the transistors 21 and 24, respectively. The control terminal T73 of the muting circuit 7 is connected to one input terminal (+) of a comparator 25 therein. A reference voltage source 26 (4.5 V) is connected to the other input terminal (−) of the comparator 25.

When the muting switch 12 is turned off, a current is not supplied to the terminal 15, so that a terminal voltage serves as a bias voltage of about 5.5 V supplied from the emitter of the transistor 21 through the resistor 20. The comparator 25 subsequently detects this as a high-level signal with respect to the reference voltage of 4.5 V. The muting circuit 7 is operated to send the output signal to the next stage so as to avoid an audio output. In this case, only a small current, as an input current component of the comparator 25, is supplied to the transistor 21. Since the transistor 24 is held in the cut-off state, substantially no current is supplied to the pilot cancel signal generator 31.

When the muting switch 12 is turned on, the control current is supplied to the terminal 15 through the variable resistor 11. A control current value is sufficiently large with respect to a resistance of the resistor 20 so as to achieve a 2-V voltage drop across the resistor 20 if the control current is entirely supplied to the resistor 20. The control current is supplied as an emitter current of the transistor 21 through the resistor 20 and at the same time as the emitter current of the transistor 24. As a result, a voltage at the terminal 15 is set to be about 3.3 V, as the emitter voltage of the transistor 24. Even if the control current value is changed by adjusting the resistance of the variable resistor 11, only the emitter current of the transistor 24 is changed, and the voltage is not substantially changed. An input voltage of 3.3 V to the comparator 25 is lower than the reference voltage of 4.5 V, and the comparator 25 detects it as a low-level signal. Therefore, muting is not performed, and the next stage is driven to generate an audio output.

As described above, the control current serves as collector currents of the transistors 21 and 24, so that substantially the same current as that supplied to the terminal 15 is supplied to the pilot cancel signal generator 31. The terminal 15 is thus used as an audio muting switch, and the control current supplied thereto is adjusted by the variable resistor 11, thereby achieving pilot cancel initialization.

The control current is supplied after it is held in the muting OFF state, i.e., the control current is adjusted while an audio signal output is enabled. In the muting ON state, the current value is greatly decreased to be distinguished from the control current of the muting OFF state. Therefore, the control current can be used for adjustment in only the muting OFF state, and no adjustment is performed in the muting ON state. Since the audio signal is blocked in the audio muting ON state, no influence is made on the overall audio signal demodulation.

The present invention as described above utilizes an audio muting circuit function for switching ON/OFF of the processed audio output signal. Only the signal processing function is adjusted at the high level of the audio output by using a control terminal in common with the muting circuit. In order to provide a multifunction IC, therefore, the required number of adjustment terminals need not be increased, simply by using a common control terminal.

What is claimed is:

1. A stereo demodulation device, comprising: a composite signal input terminal; a pilot signal detector, an input terminal of which is connected to said composite signal input terminal; a pilot level detector, an input terminal of which is connected to said composite signal input terminal; a pilot canceller, input terminals of which are respectively connected to output terminals of said pilot signal detector and said pilot level detector; a stereo demodulator, an input terminal of which is connected to said composite signal input terminal through a resistor and to an output terminal of said pilot canceller through another resistor, said output terminal of said pilot canceller being grounded through a capacitor; a muting circuit, first and second terminals of which are respectively connected to output terminals of said stereo demodulator, and a control terminal of which is connected to a control terminal of said pilot canceller and to one terminal of a variable resistor, the other end of which is grounded through a switch; right and left channel amplifiers, input terminals of which are respectively connected to said output terminals of said stereo modulator and respectively to said first and second terminals of said muting circuit; and right and left channel output terminals respectively connected to output terminals of said right and left channel amplifiers.

2. A stereo demodulation device for a composite signal that includes a pilot signal having an amplitude and a predetermined frequency, comprising:
an input terminal to which the composite signal is coupled;
a control terminal;
a muting switch having a first and a second position;
current adjusting means for generating an adjusted current, the current adjusting means being connected in series with the muting switch and generating the adjusted current when the muting switch is in the first position, wherein the current adjusting means and the muting switch are connected between the control terminal and a reference potential;
means for generating a cancel signal having a controllable amplitude and the predetermined frequency, the cancel signal generating means being connected between the input terminal and the control terminal, wherein the amplitude of the cancel signal is controlled by the amplitude of the pilot signal and the adjusted current;
means for combining the cancel signal and the composite signal and for outputting a suppressed-pilot signal, the combining and outputting means being connected to the input terminal and the cancel signal generating means;
an output terminal;
means for generating an audio signal from the suppressed-pilot signal, the audio signal generating means being connected between the combining and outputting means and the output terminal; and means for inhibiting the audio signal, the inhibiting means being connected between the control terminal and the audio signal generating means, wherein the audio signal is inhibited when the muting switch is in the second position.

3. The stereo demodulation device of claim 2, wherein the current adjusting means comprises a variable resistor.

4. The stereo demodulation device of claim 2, wherein the cancel signal generating means generates the cancel signal only when the pilot signal is included in the composite signal even when said muting switch is in the first position.

5. A stereo demodulation device, comprising:
an input terminal to which a composite signal including a pilot signal having an amplitude and a predetermined frequency is inputted;
an output terminal for outputting an audio signal;
a muting switch;
means for adjusting a current, the means and switch being connected in series between a control terminal and a ground potential, said current adjusting means adjusting a control current flowing therethrough when said muting switch is turned on;
means for generating a cancel signal, the cancel signal generating means being connected between said input terminal and said control terminal, the cancel signal having the predetermined frequency and an amplitude which is controlled by the amplitude of said pilot signal and said control current, and the cancel signal generating means having an output terminal;
two resistors connected in series between said input terminal and the output terminal of said cancel signal generating means, the resistors cancelling the pilot signal in the composite signal with the cancel signal, a cancelled-pilot composite signal being obtainable at a junction of said two resistors;
a stereo demodulator for generating an audio signal at said output terminal, the demodulator being connected between said junction of said two resistors and said output terminal; and
a muting circuit for inhibiting the audio signal from appearing at said output terminal when said muting switch is turned off, the muting circuit being connected between said control terminal and an output terminal of said stereo demodulator.

6. A stereo demodulation device according to claim 5, wherein said cancel signal generating means comprises a pilot cancel signal generator for generating the cancel signal and a parallel circuit connected between said control terminal and said pilot cancel signal generator, said parallel circuit comprising a series circuit of a resistor and a first transistor having a gate electrode connected to the ground potential through a capacitor and a second tansistor connected in parallel with said series circuit, a gate electrode of said second transistor being conencted to the ground potential through a capacitor.

* * * * *